United States Patent
Rigney et al.

(10) Patent No.: US 7,070,866 B2
(45) Date of Patent: Jul. 4, 2006

(54) NICKEL ALUMINIDE COATING WITH IMPROVED OXIDE STABILITY

(75) Inventors: Joseph D. Rigney, Milford, OH (US); David R. Clarke, Goleta, CA (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/855,687

(22) Filed: May 27, 2004

(65) Prior Publication Data

US 2005/0266266 A1 Dec. 1, 2005

(51) Int. Cl.
- B23B 15/04 (2006.01)
- B23B 15/20 (2006.01)
- B05D 3/04 (2006.01)
- C22C 19/03 (2006.01)

(52) U.S. Cl. .......... 428/680; 428/650; 427/383.1; 420/551

(58) Field of Classification Search .......... 428/680, 428/650, 660, 640, 702, 627; 501/153, 94, 501/134; 427/383.1, 383.3, 383.7; 416/241 R; 420/460, 550, 551
See application file for complete search history.

(56) References Cited

U.S. PATENT DOCUMENTS

| | | | |
|---|---|---|---|
| 4,035,191 A | 7/1977 | Johns | 106/57 |
| 5,824,423 A | 10/1998 | Maxwell et al. | 428/623 |
| 5,975,852 A | 11/1999 | Nagaraj et al. | 416/241 R |
| 6,153,313 A | 11/2000 | Rigney et al. | 428/632 |
| 6,255,001 B1 | 7/2001 | Darolia | 428/610 |
| 6,291,084 B1 | 9/2001 | Darolia et al. | 428/633 |
| 6,471,791 B1 | 10/2002 | Nazmy et al. | 148/429 |
| 2003/0118863 A1* | 6/2003 | Darolia et al. | 428/650 |

FOREIGN PATENT DOCUMENTS

| | | |
|---|---|---|
| EP | 0985745 A1 | 3/2000 |
| EP | 1378587 A1 | 1/2004 |

OTHER PUBLICATIONS

"Phase relationships in the zirconia-yttria system", H.G. Scott, Journal Of Materials Science 10, 1975, pp. 1527-1535.
European Search Report of EP Application No. 05252898.1, Feb. 7, 2006, 3 pages.

* cited by examiner

Primary Examiner—Michael E. Lavilla
(74) Attorney, Agent, or Firm—Harrington & Smith, LLP

(57) ABSTRACT

In one embodiment of the invention, a NiAl overlay bond coating composition comprises a NiAl alloy. The alloy comprises Zr and at least one modifying element in an amount effective to form a stabilized oxide structure comprising stabilized zirconia including a substantially tetragonal structure upon oxidation of the alloy. The tetragonal structure is stabilized such that it does not change phases and revert to a monoclinic or monoclinic and tetragonal structure, which is not substantially tetragonal, upon thermal cycling.

19 Claims, 1 Drawing Sheet

NICKEL ALUMINIDE COATING WITH IMPROVED OXIDE STABILITY

FIELD OF THE INVENTION

The present invention generally relates to coatings of the type used to protect components exposed to high temperature environments, such as the hostile thermal environment of a gas turbine engine. More particularly, this invention is directed to modified NiAl overlay coatings alloyed with zirconium and other elements for use as an environmental bond coat and/or as a bond coat for a thermal barrier coating, wherein the overlay coatings have improved oxide stability.

BACKGROUND OF THE INVENTION

Higher operating temperatures for gas turbine engines are continuously sought in order to increase efficiency. However, as operating temperatures increase, the high temperature durability of the components within the engine must correspondingly increase.

Significant advances in high temperature capabilities have been achieved through the formulation of nickel- and cobalt-based superalloys. For example, some gas turbine engine components may be made of high strength directionally solidified or single crystal nickel-based superalloys. These components are cast with specific external features to do useful work with the core engine flow and contain internal cooling details and through-holes to reduce airfoil temperatures. Nonetheless, when exposed to the demanding conditions of gas turbine engine operation, particularly in the turbine section, such alloys alone may be susceptible to damage by oxidation and corrosive attack and may not retain adequate mechanical properties. Thus, these components often are protected by an environmental coating or bond coat and a top thermal insulating coating often collectively referred to as a thermal barrier coating (TBC) system.

Diffusion coatings, such as aluminides and platinum aluminides applied by chemical vapor deposition processes, and overlay coatings such as MCrAlY alloys, where M is iron, cobalt and/or nickel, have been employed as environmental coatings for gas turbine components.

Ceramic materials, such as zirconia ($ZrO_2$) partially or fully stabilized by yttria ($Y_2O_3$), magnesia (MgO) or other oxides, are widely used as the topcoat of TBC systems. The ceramic layer is typically deposited by air plasma spraying (APS) or a physical vapor deposition (PVD) technique. TBC employed in the highest temperature regions of gas turbine engines is typically deposited by electron beam physical vapor deposition (EBPVD) techniques.

To be effective, the TBC topcoat must have low thermal conductivity, strongly adhere to the article and remain adherent throughout many heating and cooling cycles. The latter requirement is particularly demanding due to the different coefficients of thermal expansion between thermal barrier coating materials and superalloys typically used to form gas turbine engine components. TBC topcoat materials capable of satisfying the above requirements have generally required a bond coat, such as one or both of the above-noted diffusion aluminide and MCrAlY coatings. The aluminum content of a bond coat formed from these materials provides for the slow growth of a strong adherent continuous alumina layer (alumina scale) at elevated temperatures. This thermally grown oxide (TGO) protects the bond coat from oxidation and hot corrosion, and chemically bonds the ceramic layer to the bond coat. The performance of state of the art coatings relies on the growth of this stable, adherent and slow growing scale on the surface exposed to the gaseous environment in the case of environmental coatings and between the bond coat and TBC in TBC systems.

In recent years, overlay coatings of beta phase nickel aluminide (NiAl) intermetallic have been proposed as environmental and bond coat materials. The NiAl beta phase exists for nickel-aluminum compositions of about 30 to about 60 atomic percent aluminum, the balance of the nickel-aluminum composition being predominantly nickel. Examples of beta phase NiAl coating materials include commonly assigned U.S. Pat. No. 5,975,852 to Nagaraj et al, which discloses a NiAl overlay coating material containing chromium and zirconium. Commonly assigned U.S. Pat. Nos. 6,153,313 and 6,255,001 to Rigney et al. and Darolia, respectively, also disclose beta phase NiAl bond coat and environmental coating materials. The beta-phase NiAl alloy disclosed in Rigney et al. contains chromium, hafnium and/or titanium, and optionally tantalum, silicon, gallium, zirconium, calcium, iron and/or yttrium, while Darolia's beta phase NiAl alloy contains zirconium. The beta phase NiAl alloys of Nagaraj, Rigney et al. and Darolia have been shown to improve the adhesion of a ceramic TBC layer, thereby inhibiting spallation of the TBC and increasing the service life of the TBC system.

Even with the advances described above, there remains a considerable and continuous effort to further increase the service life of TBC systems by, for example, improving the spallation resistance of the thermal insulating layer and the oxide stability of the NiAl bond coat.

BRIEF DESCRIPTION OF THE INVENTION

In one embodiment of the invention, a NiAl overlay bond coating composition comprises a NiAl alloy. The alloy comprises Zr and at least one modifying element in an amount effective to form a stabilized oxide structure comprising stabilized zirconia including a substantially tetragonal structure upon oxidation of the alloy. The tetragonal structure is stabilized such that it does not change phases and revert to a monoclinic or monoclinic and tetragonal structure, which is not substantially tetragonal, upon thermal cycling.

In another embodiment of the invention, a stabilized oxide structure is produced by oxidizing a NiAl alloy comprising Zr and at least one modifying element selected from the group consisting of Y, Mg, Dy, Eu, Sc, La, Er, Ce, Ti, Gd and combinations thereof in an amount effective to form the stabilized oxide structure. The stabilized oxide structure comprises stabilized zirconia having a substantially tetragonal structure that does not change phases and revert to a monoclinic or monoclinic and tetragonal structure, which is not substantially tetragonal, upon heat treatment cycling. The stabilized oxide structure comprises about 4–20 mol. % of at least one modifying element oxide in the zirconia, which stabilizes the tetragonal zirconia.

In a further embodiment of the invention, a method of producing a stable, thermally grown oxide structure comprises providing a NiAl overlay bond coat comprising a NiAl alloy. The NiAl alloy comprises Zr and at least one modifying element in an amount effective to form a stabilize oxide structure comprising zirconia having a substantially tetragonal structure upon oxidation of the alloy. The method further comprises exposing the alloy to heat to thereby oxidize the alloy and form the stable, thermally grown oxide structure; wherein the tetragonal structure does not change phases and revert to a monoclinic or monoclinic and tetragonal structure, which is not substantially tetragonal, upon heating or thermal cycling.

BRIEF DESCRIPTION OF THE DRAWINGS

The foregoing and other aspects of these teachings are made more evident in the following Detailed Description, when read in conjunction with the attached Drawings, wherein.

DETAILED DESCRIPTION OF THE INVENTION

Embodiments of the present invention are generally applicable to components that operate within environments characterized by relatively high temperatures, and are thus subjected to severe thermal stresses and thermal cycling. Examples of such components include the high and low pressure turbine nozzles and blades, shrouds, combustor liners and augmentor hardware of gas turbine engines. Other examples include airfoils, in general, and static parts such as vanes. One particular example is the high pressure turbine blade 10 shown in FIG. 1. For convenience, embodiments of the invention will be described in the context of blade 10. However, it is recognized that the embodiments may be readily adapted to other components.

Figure 1:
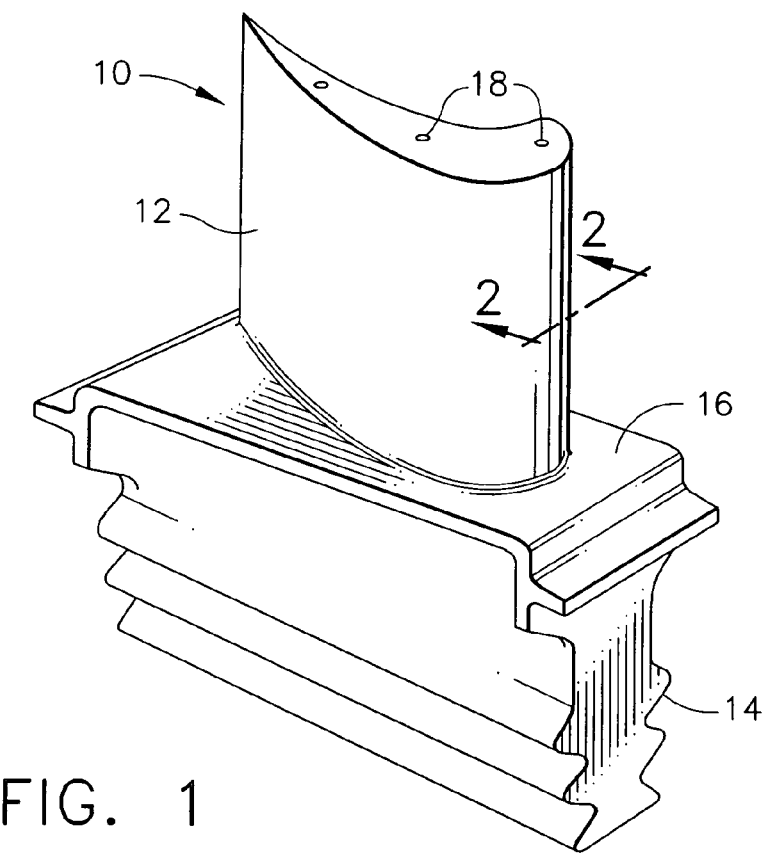
FIG. 1 is a perspective view of a high pressure turbine blade.

The blade 10 of FIG. 1 generally includes an airfoil against which hot combustion gases are directed during operation of the gas turbine engine, and whose surface is therefore subject to severe attack by oxidation, corrosion and erosion. The airfoil is anchored to a turbine disk (not shown) with a dovetail 14 formed on a platform 16 of the blade 10. Cooling holes 18 are present in the airfoil 12 through which bleed air is forced to transfer heat from the blade 10.

The base metal of the blade 10 may be any suitable material, including a superalloy of Ni or Co, or combinations of Ni and Co. Preferably, the base metal is a directionally solidified or single crystal Ni-base superalloy. The as cast thickness of the airfoil section 12 of blade 10 may vary based on design specifications and requirements.

Figure 2:
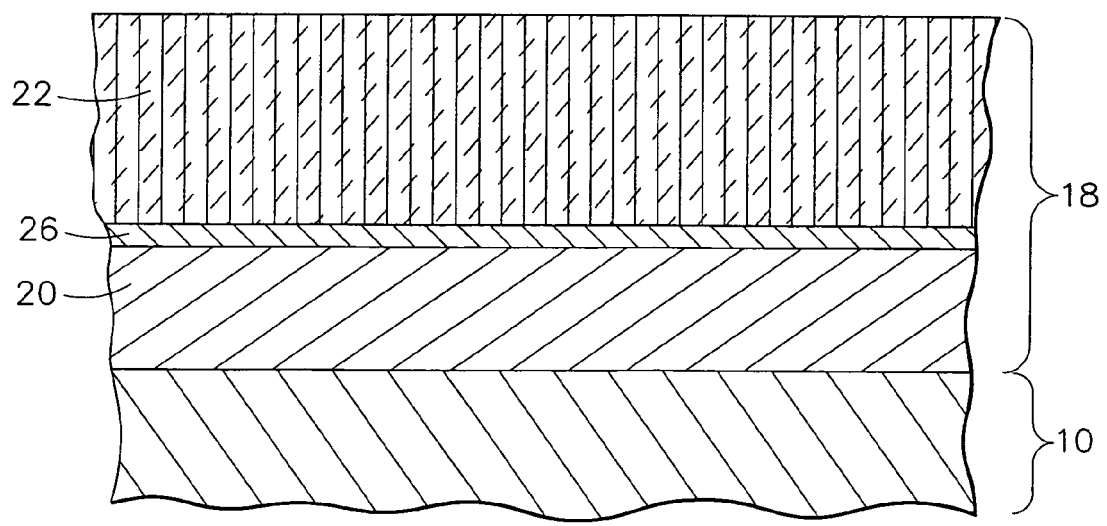
FIG. 2 shows a thermal barrier coating system, in accordance with an embodiment of the invention.

The airfoil 12 and platform 16 may be coated with a thermal barrier coating system 18 comprising a bond coat 20 disposed on the substrate of blade 10 and a ceramic thermal barrier coating 22 on top of the bond coat 20. However, it should be noted that the ceramic thermal barrier coating 22 on top of the bond coat 20 is not required to be present for purposes of the present invention. Shown in FIG. 2 is a TBC system 18 of a type that benefits from the teachings of embodiments described herein. As shown, the coating system 18 includes a ceramic layer 22 bonded to the substrate of blade 10 with an overlay bond coat 20. To attain a strain-tolerant columnar grain structure, the ceramic layer 22 is preferably deposited by physical vapor deposition (PVD), though other deposition techniques could be used. A preferred material for the ceramic layer 22 is an yttria stabilized zirconia (YSZ), with a suitable composition being about 4 to about 20 weight percent yttria. Other ceramic materials could also be used, such as yttria, nonstabilized zirconia, or zirconia stabilized by ceria, scandia or other oxides. The ceramic layer 22 may be deposited to a thickness that is sufficient to provide the required thermal protection for the underlying substrate and blade 10, such as on the order of about 125 to about 300 micrometers. The surface of the bond coat 20 oxidizes to form an aluminum oxide surface layer (alumina scale) 26 to which the ceramic layer 22 chemically bonds.

According to embodiments of the invention, the overlay bond coat 20 is a nickel aluminide intermetallic with alloying elements. For example, bond coat 20 may be predominantly of the beta NiAl phase with alloying additions. The composition of bond coat 20 is described in further detail below.

The bond coat 20 may be formed using any suitable process, such as a PVD process, thermal spraying, cathodic arc processing and sputtering. Preferably, magnetron sputter physical vapor deposition or electron beam physical vapor deposition (EBPVD) is employed. A suitable thickness for the bond coat 20 may be about 15 micrometers to protect the underlying substrate and provide an adequate supply of aluminum for oxide formation, though any suitable thickness, such as between about 10 to about 125 micrometers may also be employed.

The preferred deposition techniques are carried out to reduce the diffusion of the bond coat 20 into the underlying substrate. Preferably, deposition of the bond coat 20 results in virtually no diffusion between the bond coat 20 and the underlying base metal substrate. During subsequent heat treatment to relieve residual stresses during the deposition process, according to embodiments of the invention, a very thin diffusion zone of typically not more than about 12 micrometers, typically from about 2.5 to about 10 micrometers, may develop. A preferred heat treatment may be conducted at about 2000° F. (1093°) for about 2 to 4 hours in vacuum. The minimal thickness of the diffusion zone promotes the initial formation of the alumina scale 26 as essentially pure aluminum oxide, promotes the slow growth of the protective alumina scale 26 during engine service, reduces formation of voluminous nonadherent oxides at the bond coat-ceramic layer interface and reduces the amount of substrate material that must be removed during refurbishment of the TBC system 18. Accordingly, articles such as blade 10 may be refurbished more times than would be possible if a diffusion bond coat was employed.

According to embodiments of the invention, the NiAl bond coat 20 comprises nickel and aluminum, typically with an aluminum content of about 30 to about 60 atomic percent to attain the beta phase NiAl intermetallic. Preferably, bond coat 20 has an aluminum content at an atomic ratio of about 1:1.

Bond coat 20 also may comprise additions of zirconium typically up to about 1.2 atomic percent and preferably from about 0.1 to about 1.2 atomic percent. It has been determined that additions of about 0.1 to about 1.2 atomic percent zirconium to predominantly beta phase NiAl overlay coatings have an advantageous effect on the spallation resistant of outer ceramic layers adhered to overlay bond coats in TBC system. See U.S. Pat. No. 6,291,084 to Darolia et al.

Although additions of Zr are known to improve spallation resistance, improve oxidation resistance and provide strengthening of the matrix, and thus inclusion in NiAl coatings is desired, we have determined that long term scale adherence may be improved. For example, during oxidation, the TGO formed in some prior coatings often comprises continuous alumina and islands of zirconia. Over time, spallation may occur due to stresses developed in the scale and pores or cracks may form. In particular, zirconium oxides formed during oxidation of some prior NiAlCrZr coatings may be unstabilized. Unstabilized zirconia may transform from the monoclinic phase to tetragonal phase and back with thermal cycling. The strains experienced in the transformation may cause cracking of the TGO, resulting in faster scale growth rates or spallation.

It has been further experimentally determined that Zr in some coatings may oxidize forming zirconia embedded within aluminum TGO matrix or as pegs between the TGO and adjacent coating. Microstructural experiments suggest that TGO failure may occur as a result of cracking (scalloping) from the zirconia formed within the scale and/or connected to the bond coat. Raman spectroscopy evaluations of some prior NiAlCrZr coatings show that $ZrO_2$ may have a monoclinic and tetragonal structure at room temperature and a tetragonal structure at the oxidizing temperature. In particular, Raman spectra obtained from the TGO on a cyclically oxidized NiAlCrZr coating showing the presence of monoclinic $ZrO_2$ phases at room temperature may suggest that phase transformations are occurring in the scale during cycling. During cycling, the volume change in the transformations between the two structures may lead to stresses in the TGO, which may further lead to cracking and faster transport of oxygen to the coating surface.

Thus, in accordance with embodiments of the invention, we have advantageously determined how to modify the chemistry and subsequent phase stability of the formed zirconia and the chemistry of the as deposited bond coat from which the oxide forms. This advantageously enables the formation of stabilized TGO structures having enhanced performance capabilities and comprising $Al_2O_3$ phases plus $ZrO_2$ base phases. In particular, we have developed a method of creating stabilized $ZrO_2$ pegs or phases during oxidation. Oxidation may typically occur during coating processing, heat treatment, application of a top ceramic layer and/or during engine service. For example, bond coat 20 may be heated at about 1800°–2000° F. (982° C. –1093° C.) for about 1 to 16 hours processing.

More particularly, we have determined that for a given NiAl bond coat including Zr, other modifying alloying additions or elements (MEs) may be selected and controlled to result in a stabilized, oxidized structure having stabilized zirconia. Based on phase diagram analyses, we have determined that a desired mol. % range of total modifying alloying additions or elements of between about 4 and about 20% is typically suitable to avoid reversion to a monoclinic phase or nionoclinic/tetragonal phase combination from the higher temperature tetragonal phase during cycling. It is noted, however, that minor amounts of the monoclinic phase such as less than about 10 vol. % may not be detrimental to stability. Thus, it may not be necessary for the TGO structure and zirconia phases to have a pure tetragonal structure as long as the stability is not adversely affected by any other phases present. Thus, according to embodiments of the invention, a complete tetragonal or substantially tetragonal $ZrO_2$ phase (e.g. about 90 vol. % or greater tetragonal) would be present at room temperature as well as at the higher oxidizing temperatures during cycling. Thus, phase changes, which may cause cracking in the vicinity of the zirconia phases may be prevented.

Based on the afore-desired mol. % range, the composition of bond coat 20 may be tailored and determined. Accordingly, in a preferred embodiment of the invention, the composition of bond coat 20 may comprise, in addition to the afore-described NiAl and Zr content, an appropriate ratio of Y to Zr+Y to enable the formation of about 4 to about 18 mol % $YO_{1.5}$ in $ZrO_2$, which stabilizes the $ZrO_2$ forming a stabilized TGO structure. Based on phase diagram analysis for a system containing zirconia and yttria, the desired phase stability was determined to be in the range of about 4 to about 18 mole percent $YO_{1.5}$ in $ZrO_2$. Once this range was determined and the amount of the total MEs present in the composition including Zr, was selected, the appropriate amounts of individual MEs and Zr needed to be added to the bond coat 20 composition could be readily determined. Advantageously, the overall level of constituents may be adjusted based on desired properties and coating needs.

As set forth in Table 1, similarly, other elements when incorporated with Zr and oxidized will also stabilize the crystal structure. Such oxides include, but are not limited to, divalent stabilizers such as oxides of Ca, Mg and combinations thereof, trivalent stabilizers such as oxides of Dy, La, Eu, Sc, Y, Er, Gd and combinations thereof, pentavalent stabilizers such as oxides of Ta, as well as quadravalent stabilizers such as oxides of Ce and Ti.

Table 1 below provides an example of suitable contents and ranges of elements, when added alone or in combination to Zr containing NiAl overlay coatings.

TABLE 1

Calculated Modifying Element (ME) Contents for Element Additions to Zr- Containing NiAl Based Coatings.

| Modifying Element (ME) | Oxide | Approx. mol. % range of ME in Zr or approx. mol % of ME oxide in $ZrO_2$ (Approx. range of ME Oxide to Stabilize $ZrO_2$) | Approx. at. % ME at about 0.2 at. % ME total content including Zr (Approx. at. % ME content in coating with reactive element total of about 0.2 at. %) | Approx. at. % ME at about 1 at. % ME total content including Zr (Approx. at. % ME content in coating with reactive element total of about 1 at. %) | Approx. min. ME at. % | Approx. max ME at. % |
|---|---|---|---|---|---|---|
| Ca | CaO | 4 to 15 | 0.008 to 0.03 | 0.04 to 0.15 | 0.008 0.008 | 0.15 0.15 |
| Mg | MgO | 4 to 12 | 0.008 to 0.024 | 0.04 to 0.12 | 0.008 0.008 | 0.12 0.12 |
| Dy | $DyO_{1.5}$ | 4 to 20 | 0.008 0.04 | 0.04 0.2 | 0.008 0.008 | 0.2 0.2 |
| Eu | $EuO_{1.5}$ | 4 to 13 | 0.008 0.026 | 0.04 0.13 | 0.008 0.008 | 0.13 0.13 |
| Gd | $GdO_{1.5}$ | 4 to 20 | 0.008 0.04 | 0.04 0.2 | 0.008 0.008 | 0.2 0.2 |
| Sc | $ScO_{1.5}$ | 4 to 17 | 0.008 0.034 | 0.04 0.17 | 0.008 0.008 | 0.17 0.17 |

TABLE 1-continued

Calculated Modifying Element (ME) Contents for Element Additions to Zr- Containing NiAl Based Coatings.

| Modifying Element (ME) | Oxide | Approx. mol. % range of ME in Zr or approx. mol % of ME oxide in $ZrO_2$ (Approx. range of ME Oxide to Stabilize $ZrO_2$) | Approx. at. % ME at about 0.2 at. % ME total content including Zr (Approx. at. % ME content in coating with reactive element total of about 0.2 at. %) | Approx. at. % ME at about 1 at. % ME total content including Zr (Approx. at. % ME content in coating with reactive element total of about 1 at. %) | Approx. min. ME at. % | Approx. max ME at. % |
|---|---|---|---|---|---|---|
| La | $LaO_{1.5}$ | 4 to 20 | 0.008 0.04 | 0.04 0.2 | 0.008 0.008 | 0.2 0.2 |
| Y | $YO_{1.5}$ | 4 to 18 | 0.008 0.036 | 0.04 0.18 | 0.008 0.008 | 0.18 0.18 |
| Er | $ErO_{1.5}$ | 4 to 20 | 0.008 0.04 | 0.04 0.2 | 0.008 0.008 | 0.2 0.2 |
| Ce | $CeO_2$ | 10 to 40 | 0.02 0.08 | 0.1 0.4 | 0.02 0.02 | 0.4 0.4 |
| Ti | $TiO_2$ | 5 to 20 | 0.01 0.04 | 0.05 0.2 | 0.01 0.01 | 0.2 0.2 |

*oxide-one metal atom and oxygen atom; can be fractional

For instance, as shown in Table 1 for the first element, a NiAl bond coat comprising Zr and Ca was chosen for the bond coating system. The system was also chosen to include about 0.2 at % or about 1 at. % of total modifying elements (ME) including the Zr content (or total reactive element content (RE)). See columns 4–5. Based on phase diagram analysis, it was then determined that about 4 to about 15 mol. % Ca oxide (ME oxide) in the Zr oxide was suitable to maintain a stable, substantially tetragonal phase without reverting to an unstable monoclinic phase upon thermal cycling. With the above values, the amount of Ca to be included into the bond coating 20 composition could readily be determined (see Cols. 4–5 of Table 1). Thus, based on Col. 4, about 0.008–0.03 at. % Ca and about 0.192 at % down to about 0.17 at. % Zr, respectively, may be employed in the composition of bond coat 20 to achieve the desired afore-referenced mol. % of between about 4 to about 15 for stability.

Thus, in sum NiAl coatings containing Zr and high amounts of Al will typically form both alumina ($Al_2O_3$) and zirconia ($ZrO_2$) during high temperature exposure at temperatures greater than, for example, about 1800° F. (982° C.) in an oxidizing environment. During thermal cycling to low temperature, for example, room temperature to about 100° F. (538° C.), and back to elevated temperatures, 2200° F. (1204° C.), it has been determined that $ZrO_2$ that may have been formed can transform back and forth from tetragonal to monoclinic phases in some prior coatings. The phase changes are accompanies by significant volume changes that can cause stress that then can lead to cracking of the scale.

Advantageously, embodiments of the invention describe modifying elements (ME) that can be added in conjunction with Zr to provide stabilization of mixed oxide that would subsequently form. It is assumed that the ME and Zr in the coating, when oxidized, may form oxides in the same molar ratio as in the coating and that the oxides formed will be a homogeneous compound. Thus, the ME chosen and the amount to be incorporated will enable a tetragonal or substantially tetragonal stabilized $ZrO_2$-ME-oxide to be formed. Some of the ME-oxides that stabilize the tetragonal phase are shown in Table 1; the range of ME-oxide that should be present in $ZrO_2$ is also shown.

Since Zr and the ME identified may also be considered reactive elements, the preferred range of reactive elements desired in the coating may be chosen to be maintained. For instance, if a total reactive element level of about 0.5 at. % is targeted and Y is added in conjunction with Zr to form yttria-stabilized zirconia (YSZ), the total of Y+Zr should equal about 0.5 at. %. The amount of Y to add, and balance of Zr to maintain may be determined, for example, by knowing:

(1) The substitution reaction (e.g. one mole of $YO_{1.5}$ replaces one mole of $ZrO_2$)

(2) The total reactive element (RE) content desired in the coating (3) The amount of ME-oxide required to stabilize $ZrO_2$.

As a further example, if a total reactive element content of about 0.50% was desired, Y was to be added to the coating, and a minimum of about 4 mol % $YO_{1.5}$ or maximum of about 18 mol % $YO_{1.5}$ was desired for stabilization, the following calculations could be done:

For minimum level (about):

Y (at. %)=(0.5 at. % total RE content)×(4% or 4/100) =0.02 at. %

Zr=0.50–0.02=0.48; and

For maximum level (about):

Y (at. %)=(0.5 at. % total RE content)×(18% or 18/100) =0.09 at. %

Zr=0.50–0.09=0.41 at. %.

In general, the following calculations may be completed:

Minimum ME content=(total RE content)×(minimum mole fraction oxide needed for stabilization)

Maximum ME content=(total RE content)×(maximum mole fraction oxide needed for stabilization)

Minimum Zr content=(total RE content)−(maximum ME content)

Maximum Zr content=(total RE content)−(minimum ME content).

The calculations in the Table illustrate examples of such calculations that may be completed for various modifying elements, ranges over which the oxides of these ME's provide phase stabilization, and for two different select total reactive element content totals. Of course, the calculations may be customized to any Zr or other element level or combination and any fixed ME-oxide content desired for the coating.

Table 1 also advantageously demonstrates that for a given NiAl bond coat including Zr, alloying additions may be selected and controlled to result in a stabilized, oxidized structure containing stabilized zirconia. We have determined that oxidized structures having the mol. % content range set forth in the third column of Table 1 may advantageously maintain a stable tetragonal $ZrO_2$ phase without reverting back to a monoclinic $ZrO_2$ phase upon thermal cycling. Thus, this stabilized zirconia may prevent cracking of the TGO, reduce scale growth rates and spallation.

The above Table 1 is meant to be merely illustrative and therefore non-limiting. For example, according to embodiments of the invention, additional or alternative elements, alone or in combination, may be employed in the NiAl bond coat 20 to form a stabilized structure. For instance, bond coat 20 may also comprise between about 0–15 at. % chromium, between about 0–2 at. % hafnium, among other elements and combinations depending upon the desired properties of the bond coat 20. Other elements such as silicon, iron and gallium, to name a few, may also be included in amounts up to about 5 at. %, up to about 1 at. % and up to about 0.5 at. %, respectively.

While various embodiments are described herein, it will be appreciated from the specification that various combinations of elements, variations or improvements therein may be made by those skilled in the art, and are within the scope of the invention.

What is claimed is:

1. A NiAl overlay bond coating composition comprising a NiAl alloy, the alloy comprising Zr and at least one modifying element in an amount effective to form a stabilized oxide structure comprising stabilized zirconia including a substantially tetragonal structure upon oxidation of the alloy, wherein the tetragonal structure is stabilized such that it does not change phases and revert to a monoclinic or monoclinic and tetragonal structure, which is not substantially tetragonal, upon thermal cycling.

2. The composition of claim 1, wherein the element is Y in an amount effective to form between about 4 and about 18 mol % $YO_{1.5}$ in the zirconia, which stabilizes the zirconia.

3. The composition of claim 1, wherein the element is Ti in an amount effective to form between about 5 and about 20 mol. % $TiO_2$ in the zirconia, which stabilizes the zircoma.

4. The composition of claim 1, wherein the stabilized oxide structure comprises at least one oxide selected from the group consisting of a divalent stabilizing oxide, a trivalent stabilizing oxide, a quadravalent stabilizing oxide and a pentavalent oxide.

5. The composition of claim 4, wherein the divalent stabilizing oxide is selected from the group consisting of an oxide of Ca, Mg and combinations thereof; the trivalent stabilizing oxide is selected from the group consisting of an oxide of Dy, La, Eu, Sc, Y, Er, Gd and combinations thereof; the pentavalent stabilizing oxide is Ta; and the quadravalent oxide is selected from the group consisting of an oxide of Ce and Ti.

6. A NiAl overlay bond coating composition comprising a NiAl alloy, the alloy comprising Zr and at least one modifying element in an amount effective to form a stabilized oxide structure comprising stabilized zirconia including a substantially tetragonal structure upon oxidation of the alloy, wherein the tetragonal structure is stabilized such that it does not change phases and revert to a monoclinic or monoclinic and tetragonal structure, which is not substantially tetragonal, upon thermal cycling wherein the element is an element selected from the group consisting of Mg in an amount effective to form between about 4 and about 12 mol. % MgO in the zirconia, which stabilizes the zirconia, Dy in an amount effective to form between about 4 and about 20 mol. % $DyO_{1.5}$ in the zirconia, which stabilizes the zirconia, Eu in an amount effective to form between about 4 and about 13 mol. % $EuO_{1.5}$ in the zirconia, which stabilizes the zirconia, Sc in an amount effective to form between about 4 and about 17 mol. % $ScO_{1.5}$ in the zirconia, which stabilizes the zirconia, La in an amount effective to form between about 4 and about 20 mol. % $LaO_{1.5}$ in the zirconia, which stabilizes the zirconia, Er in an amount effective to form between about 4 and about 20 mol. % $ErO_{1.5}$ in the zirconia, which stabilizes the zirconia, Ce in an amount effective to form between about 10 and about 40 mol. % $CeO_2$ in the zircoma, which stabilizes the zirconia, and Gd in an amount effective to form between about 4 and about 20 mol.% $GdO_{1.5}$ in the zirconia.

7. The composition of claim 6, wherein the alloy comprises between about 0.2 and about 1 at. % Zr.

8. The composition of claim 6, wherein the alloy comprises i) about 0.2 at. % total of Zr and ii) the at least one modifying element is selected from the group consisting of, in at. %: 0.008–0.024 Mg, 0.008–0.04 Dy, 0.008–026 Eu, 0.008–0.034 Sc, 0.0080.04 La, 0.008–0.04 Er, 0.008–0.04 Gd, and 0.02–0.08 Ce.

9. The composition of claim 6, wherein the alloy comprises i) about 1 at. % total Zr and ii) the at least one modifying element is selected from the group consisting of, in at. %:, 0.04–0.12 Mg, 0.04 –0.2 Dy, 0.04–0.13 Eu; 0.04–0.17 Sc, 0.04–0.2 La, 0.04–0.2 Er, 0.04–0.2 Gd, and 0.01–0.4 Ce.

10. The composition of claim 6, wherein the alloy further comprises at least one element selected from the group consisting of: hafnium from about 0–2 at. %, chromium from about 0–15 at. %, silicon from about 0–5 at. %, iron from about 0–1 at. % and gallium from about 0–0.5 at. %.

11. The composition of claim 10, wherein the alloy is a beta NiAl alloy comprising between about 30 and about 60 at. % Al.

12. A thermal barrier coating system comprising a base metal substrate, the NiAl overlay bond coating of claim 6 deposited over the substrate and a ceramic thermal barrier layer deposited over the NiAl overlay coating.

13. The composition of claim 6, wherein the alloy comprises a range between about 0.1–2 at. % of Zr and modifying elements to stabilize the zirconia.

14. The composition of claim 13, wherein the range is between about 0.1–1.2 at. %.

15. The composition of claim 14, wherein the range is between about 0.2–1 at. %.

16. The composition of claim 13, wherein the stabilized oxide structure comprises between about 4–20 mol. % of the modifying elements oxides in the zirconia, which stabilizes the zirconia.

17. A stabilized oxide structure produced by oxidizing a NiAl alloy comprising Zr and at least one modifying element selected from the group consisting of, Mg, Dy, Eu, Sc, La, Er, Gd, Ce, and combinations thereof in an amount effective to form the stabilized oxide structure, wherein the stabilized oxide structure comprises stabilized zirconia having a substantially tetragonal structure that does not change phases and revert to a monoclinic or monoclinic and tetragonal structure, which is not substantially tetragonal, upon heat treatment cycling, and the stabilized oxide structure comprises about 4–20 mol. % of at least one modifying element oxide in the zirconia, which stabilizes the tetragonal zirconia.

18. A method of producing a stable, thermally grown oxide structure comprising:

provided a NiAl overlay bond coat comprising a NiAl alloy, the NiAl alloy comprising Zr and at least one modifying element selected from the group consisting of Mg, Dy, Eu, Sc, La, Er, Gd, and Ce in an amount effective to form a stabilize oxide structure comprising zirconia having a substantially tetragonal structure upon oxidation of the alloy; and exposing the alloy to heat to thereby oxidize the alloy and form the stable, thermally grown oxide structure; wherein the tetragonal structure does not change phases and revert to a monoclinic or monoclinic and tetragonal structure, which is not substantially tetragonal, upon heating or thermal cycling.

19. The method of claim 18, wherein the stabilized oxide structure comprises about 4–20 mol. % of at least one modifying element oxide in the zirconia, which stabilizes the zirconia.

* * * * *